US011873098B2

(12) United States Patent
Slane et al.

(10) Patent No.: US 11,873,098 B2
(45) Date of Patent: Jan. 16, 2024

(54) HEATER DESIGN FOR CARBON ALLOTROPE ICE PROTECTION SYSTEMS

(71) Applicant: Goodrich Corporation, Charlotte, NC (US)

(72) Inventors: Casey Slane, Tallmadge, OH (US); Jin Hu, Hudson, OH (US); Nathaniel Ching, Hartville, OH (US); Galdemir Cezar Botura, Akron, OH (US); James A. Mullen, Wadsworth, OH (US); Mark James Didyk, Mogadore, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 1156 days.

(21) Appl. No.: 16/573,123

(22) Filed: Sep. 17, 2019

(65) Prior Publication Data

US 2020/0140097 A1    May 7, 2020

Related U.S. Application Data

(60) Provisional application No. 62/748,975, filed on Oct. 22, 2018.

(51) Int. Cl.
| | |
|---|---|
| *B64D 15/12* | (2006.01) |
| *H05B 3/14* | (2006.01) |
| *B82Y 30/00* | (2011.01) |
| *F02C 7/047* | (2006.01) |

(52) U.S. Cl.
CPC ............. *B64D 15/12* (2013.01); *H05B 3/145* (2013.01); *B82Y 30/00* (2013.01); *F02C 7/047* (2013.01); *H05B 2203/017* (2013.01); *H05B 2214/02* (2013.01); *H05B 2214/04* (2013.01)

(58) Field of Classification Search
CPC ........ B64D 15/12; B82Y 30/00; H05B 3/145; H05B 2203/017; H05B 2214/02; H05B 2214/04; F02C 7/047
USPC ........................................................ 219/202
See application file for complete search history.

(56) References Cited

U.S. PATENT DOCUMENTS

| | | | |
|---|---|---|---|
| 4,561,613 A | 12/1985 | Weisend, Jr. | |
| 4,737,618 A * | 4/1988 | Barbier | H05B 3/36 |
| | | | 219/520 |
| 5,412,181 A | 5/1995 | Giamati | |

(Continued)

FOREIGN PATENT DOCUMENTS

| | | |
|---|---|---|
| DE | 3907557 A1 | 9/1990 |
| EP | 3333080 A1 | 6/2018 |

(Continued)

OTHER PUBLICATIONS

DBK Industrial, Wire Heating Technology Heating with traditional resistance wire, 2022, 7 (Year: 2022).*

(Continued)

*Primary Examiner* — Dana Ross
*Assistant Examiner* — James F Sims, III
(74) *Attorney, Agent, or Firm* — Kinney & Lange, P.A.

(57) ABSTRACT

An ice protection system for an aircraft component includes a plurality of heaters. The aircraft component has at least two section and a junction area. At least one of the heaters is an H-shape carbon allotrope heater designed to apply heat to the junction area and prevent ice accumulation in the junction area.

10 Claims, 6 Drawing Sheets

(56) References Cited

U.S. PATENT DOCUMENTS

| | | | | |
|---|---|---|---|---|
| 5,456,890 | A * | 10/1995 | Tsai | F01N 3/2013 |
| | | | | 502/527.22 |
| 5,475,204 | A | 12/1995 | Giamati et al. | |
| 6,338,455 | B1 * | 1/2002 | Rauch | H05B 3/16 |
| | | | | 244/134 R |
| 9,849,991 | B2 | 12/2017 | Botura et al. | |
| 10,470,250 | B2 * | 11/2019 | Mullen | B64D 15/12 |
| 2012/0223069 | A1 * | 9/2012 | Morikawa | H01L 21/67103 |
| | | | | 219/538 |
| 2016/0009400 | A1 | 1/2016 | English et al. | |

FOREIGN PATENT DOCUMENTS

| | | | | |
|---|---|---|---|---|
| JP | 2001153707 A | * | 6/2001 | |
| WO | WO-2013142594 A1 | * | 9/2013 | ....... H01L 21/67103 |

OTHER PUBLICATIONS

DBK Industrial, Wire Heating Technology Heating with traditional resistance wire, 2022 (Year: 2022).*

Extended European Search Report for EP Application No. 19204426.1, dated Jan. 24, 2020, pp. 10.

Communication Pursuant to Article 94(3) EPC for EP Application No. 19204426.1, dated Mar. 11, 2021, pp. 4.

* cited by examiner

HEATER DESIGN FOR CARBON ALLOTROPE ICE PROTECTION SYSTEMS

CROSS-REFERENCE TO RELATED APPLICATION(S)

This application claims the benefit of U.S. Provisional Application No. 62/748,975 filed Oct. 22, 2018 for "HEATER DESIGN FOR CARBON ALLOTROPE ICE PROTECTION SYSTEMS" by C. Slane, J. Hu, N. Ching, G. C. Botura, J. A. Mullen, M. J. Didyk.

BACKGROUND

This application relates generally to ice protection and specifically to ice protection heaters.

An aircraft moving through the air is often subjected to ice formation, and anti-icing or de-icing devices must be used to remove or prevent ice from accumulating on exterior surfaces of the aircraft. For any type of electrical heaters or de-icing heaters, the closer the heater is to the external surface of an airfoil, nacelle, nosecone, engine cowl, or other aircraft part, the less power it takes to heat or de-ice the aircraft element due to the proximity of the heater to the external surface.

In aircraft, electrothermal ice protection systems (IPS) containing such heaters are applied to the backsides or embedded in leading edges to provide the required heat to leading edge surface that are otherwise subject to ice formation. Due to high thermal cooling loads on leading edges while the aircraft is in flight, heat does not easily spread from the IPS along the leading edge to areas that do not have heaters directly underneath. For this reason, aircraft parts that contain multiple sections, segments or slates requiring breaking in the leading edge surface are susceptible to ice growth in the joint or junction areas not covered by IPS heaters edges.

SUMMARY

In one embodiment, an ice protection system includes a first section, a second section attached to the first section by a joint, and a junction section, a first plurality of heaters expanding spanwise across the first section, a second plurality of heaters expanding spanwise across the second section, a first H-shaped heater on the first section, expanding into the junction section, and a second H-shaped heater on the second section, expanding into the junction section. The first section has a first span and a first chord. The second section has a second span and a second chord. The junction section includes a portion of the first section and a portion of the second section proximal the portion of the first section In a second embodiment, an ice protection system includes a component having a plurality of sections and a plurality of heaters each having at least one chordwise section connected to a spanwise section. Each of the plurality of sections is connected to the adjacent section by a junction section. One of the plurality of heaters resides on each of the plurality of sections, and each of the chordwise sections resides in a junction section.

In a third embodiment, an H-shaped heater includes a first chordwise section, a second chordwise section parallel to the first chordwise section, wherein the first chordwise section and the second chordwise section are aligned, and a spanwise section extending from a central region of the first chordwise section to a central region of the second chordwise section.

DETAILED DESCRIPTION

A heater having at least one chordwise section connected to a spanwise section can be used on aircraft components on or near junction sections to allow full heated coverage and ice protection. Such heaters can be H-shaped, T-shaped, or L-shaped. For instance, an H-shaped heater has two chordwise sections connected at their center by a spanwise section. Similarly, a T- shaped or L-shaped heater has one chordwise section connected to a spanwise section. This configuration can mitigate cold where component sections are joined to form a junction by allowing electrical connection to chordwise sections that fit in such junction sections. This approach can particularly be used with carbon allotropes like carbon nanotube (CNT) based heater systems, as carbon allotrope systems allows for electrical connections at the end of each section of a heater.

Figure 1:
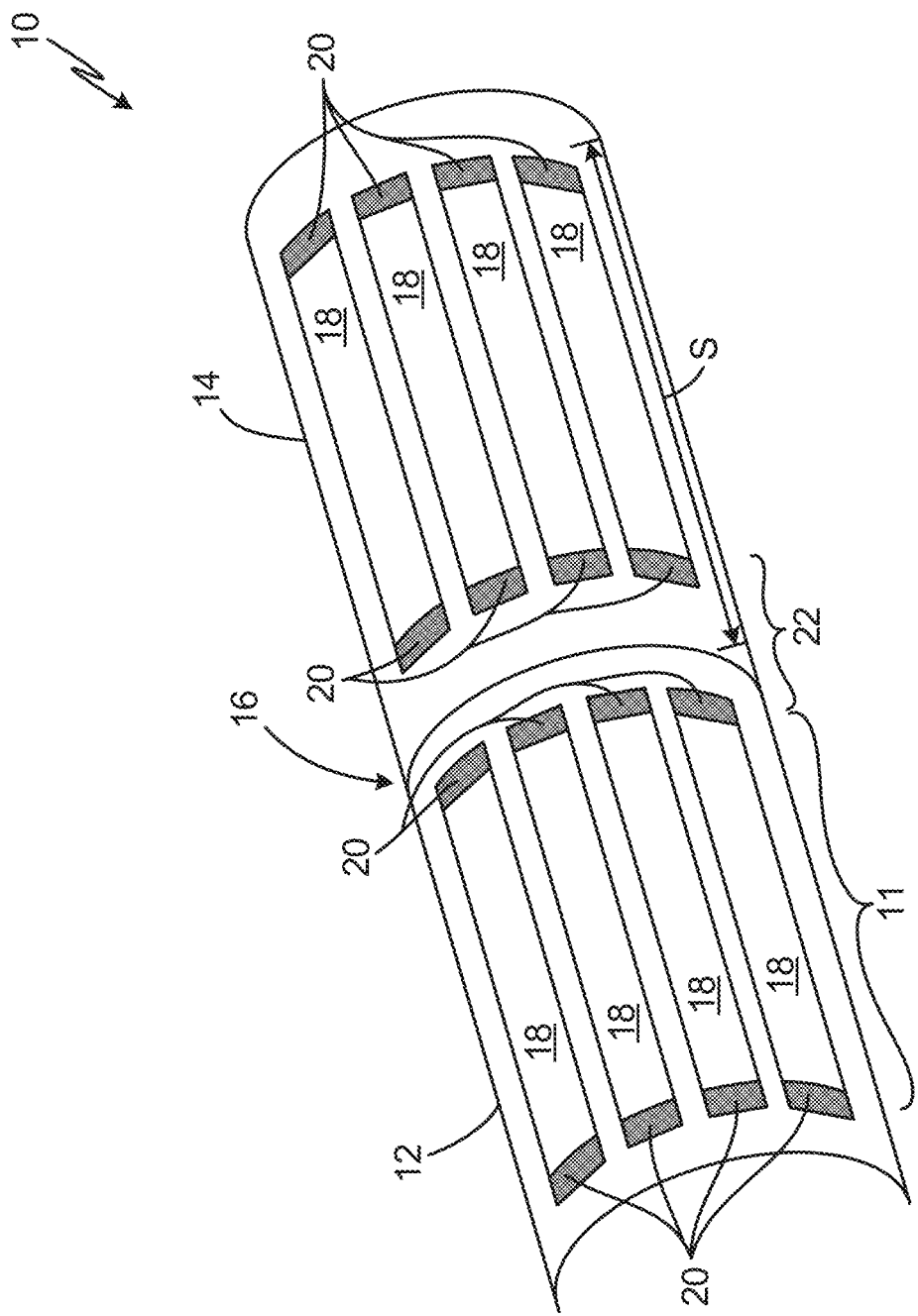
FIG. 1 is a schematic drawing of a heated leading edge with an ice protection system (IPS) in a prior art configuration.

FIG. 1 is a schematic drawing of a heated leading edge 10 with ice protection system (IPS) 11 in a prior art configuration. IPS 11 includes first section 12, second section 14, junction section 16, heaters 18 with electrical connections 20, and cold section 22.

First section 12 and second section 14 of the leading edge can be, for example, panels on a wing that are joined at junction section 16. Heaters 18 are on or embedded in each of first section 12 and second section 14 for ice protection. Heaters 18 can be, for example, carbon allotrope based heaters, metallic heaters, or other ice protection systems. Heaters 18 run spanwise S across each of component sections 12, 14, and heat a large portion of sections 12, 14. Heaters 18 are electrically connected to a power sources at electrical connections 20.

However, heaters 18 are unable to run across junction section 16, as first section 12 and second section 14 are manufactured as separate, removable assemblies; for example, they may be required to be installed or removed independently or move independently from one another during flight as in the case of retractable slats. Because of this, during flight, where there are high thermal cooling loads on IPS 10, heaters 18 are unable to spread heat beyond the immediate area in which they reside. This results in cold section 22 near junction section 16. Additionally, electrical connections 20 are the end of heaters 18 are generally cooler than the body of heaters 18. For this reason, the electrical connections 20 on heaters 18 further contribute the creation of cold section 22. Cold section 22 is subject to ice formation because it is unheated. Ice formation in cold section 22 effects aerodynamics, wing operation such as power slats, and acts as an anchor for further ice accumulation.

Figure 2:
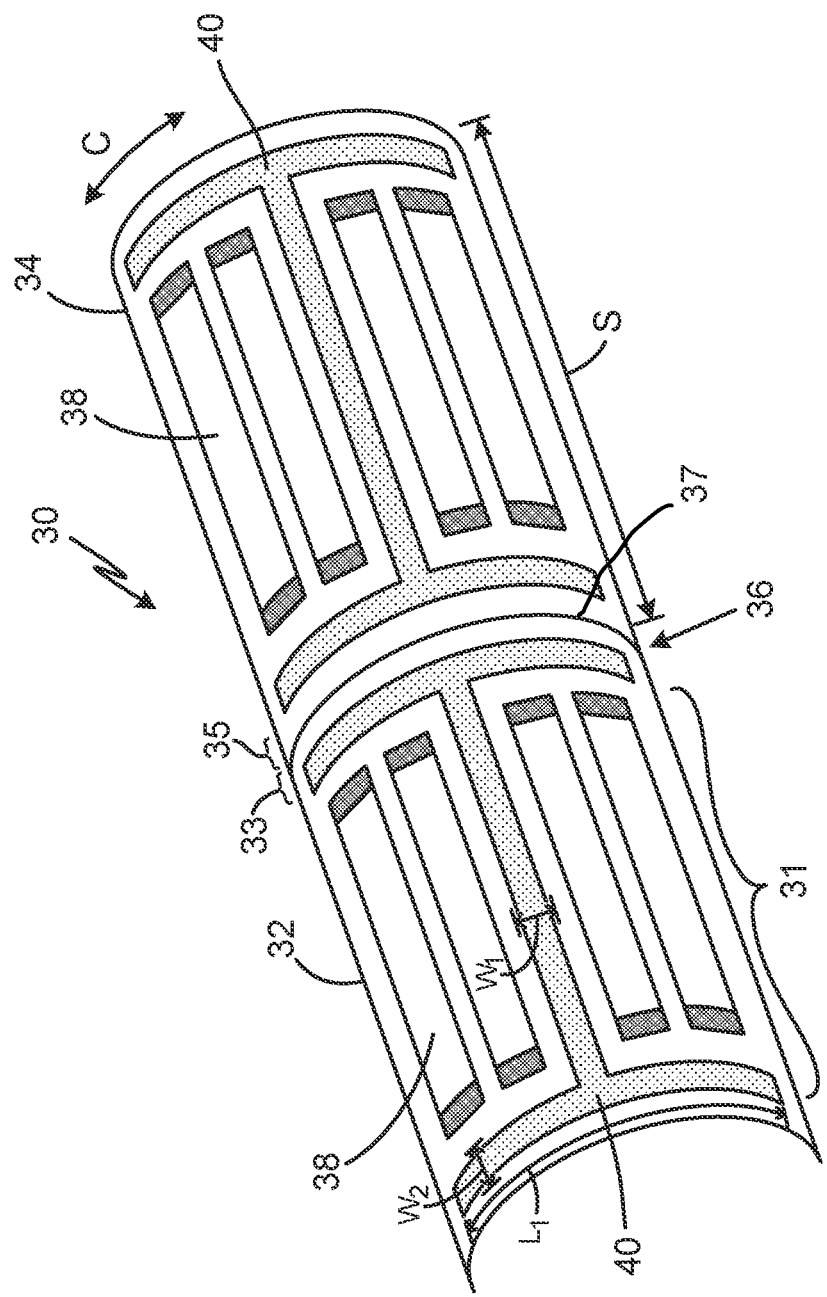
FIG. 2 is a schematic drawing of a heated leading edge with an IPS including an H-shaped carbon allotrope heater.

FIG. 2 is a schematic drawing of heated leading edge assembly 30 with IPS 31 including an H-shaped carbon allotrope heater. Leading edge assembly 30 includes first section 32 with end portion 33, second section 34 with end portion 35, junction section 36 with joint 37, linear heaters 38, and H-shaped heaters 40.

Leading edge assembly 30 can be, for example, the leading edge on a wing. A leading edge is one example of a component to which IPS 31 could be applied. For example, IPS could be applied to a leading edge of a vertical stabilizer or horizontal stabilizer, or other components containing a junction and needing even heating for ice protection.

Leading edge assembly 30 contains first section 32, second section 34 joined at junction section 36. End portion 33 of first section 32 and end portion 35 of second section 34 are adjacent to each other and make up junction section 36. Junction section 36 contains joint 37 where first section 32 and second section 34 meet. Linear heaters 38 reside on and heat first section 32 and second section 34, but do not heat portions 33, 35, which make up junction section 36 surrounding joint 37. Instead, H-shaped heaters fill in space in junction section 36 and heat adjacent to joint 37 joining first section 32 portion 33 and second section 34 portion 35. In some embodiments, joint 37 can be a segment or intersection or one or more components or parts.

H-shaped heaters 40 promote ice protection and heating across component sections 32, 34 including junction section 36. H-shaped heaters 40 have an electrical resistivity between between 0.005 ohms per square ($\Omega$/sq) and 3.0 $\Omega$/sq.

Each H-shaped heater 40 has two chordwise sections with length $L_1$ and width $W_2$, centrally connected by a spanwise (S) section with width $W_1$ (about double the width $W_2$ of chordwise sections). The chordwise (C) sections are disposed on or embedded in first section 32 and second section 34 such that they extend out into junction section 36 past the ends of linear heaters 38. This allows for chordwise sections to be as close as possible to a joint in junction section 36 and eliminate the cold section 22 discussed in reference to FIG. 1.

The chordwise sections of the H-shaped heaters 40 are electrically coupled to the spanwise sections and operated in anti-icing mode to prevent ice formation and growth. Various electrical configurations and specific geometries can be used to provide different heating profiles depending on the heating needs for the component to which H-shaped heaters 40 are applied. Physical and electrical layouts of heaters 40 are discuss in more depth with regards to FIGS. 3A-3B and 4A-4B.

H-shaped heaters 40 are made of a carbon allotrope material. For example, carbon nanotubes (CNTs) are allotropes of carbon having a generally cylindrical nanostructure, and have a variety of uses in nanotechnology, electronics, optics and other materials sciences. CNTs are both thermally and electrically conductive, in addition to being lightweight. Due to these properties, CNTs can be used as heaters to prevent icing on aircraft or other vehicles. Other carbon allotropes, such as graphene or graphene nanoribbons (GNRs), can also be used for heating or de-icing. Graphene has a two-dimensional honeycomb lattice structure, and is much stronger than steel, but is still electrically and thermally conductive. GNRs are strips of graphene with ultra-thin widths, typically less than 50 nm per strip.

Carbon allotrope heaters are uniquely beneficial for de-icing because of their high efficiency, light weight and ability to be molded into specific shapes, and durability. They are more durable long term compared to traditional metallic heaters, and can be shaped more easily for specific application needs.

Figure 3A:
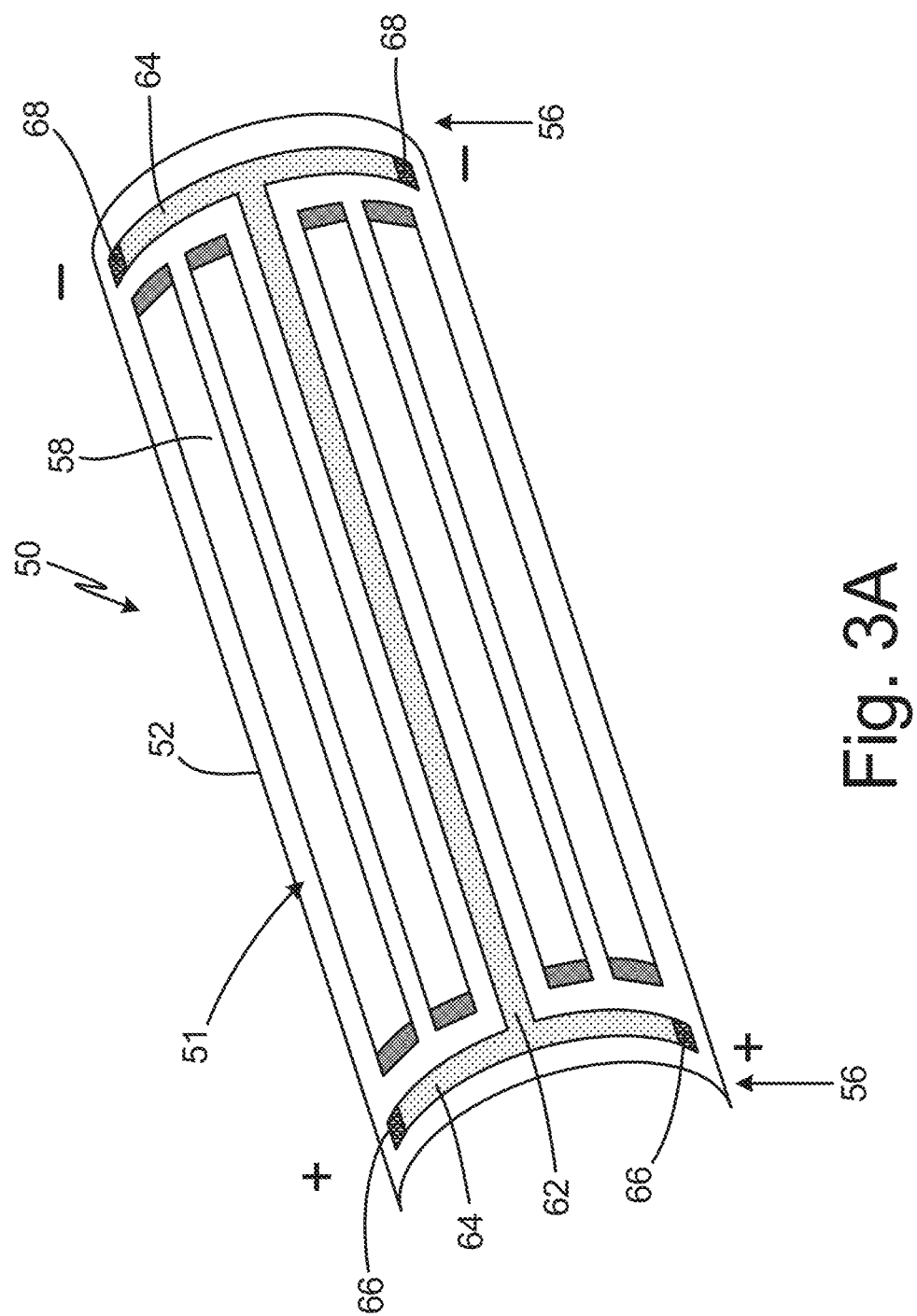
FIG. 3A-3B are schematic drawings of a heated leading edge with an IPS including an H-shaped carbon allotrope heater in a first embodiment.
Figure 3B:
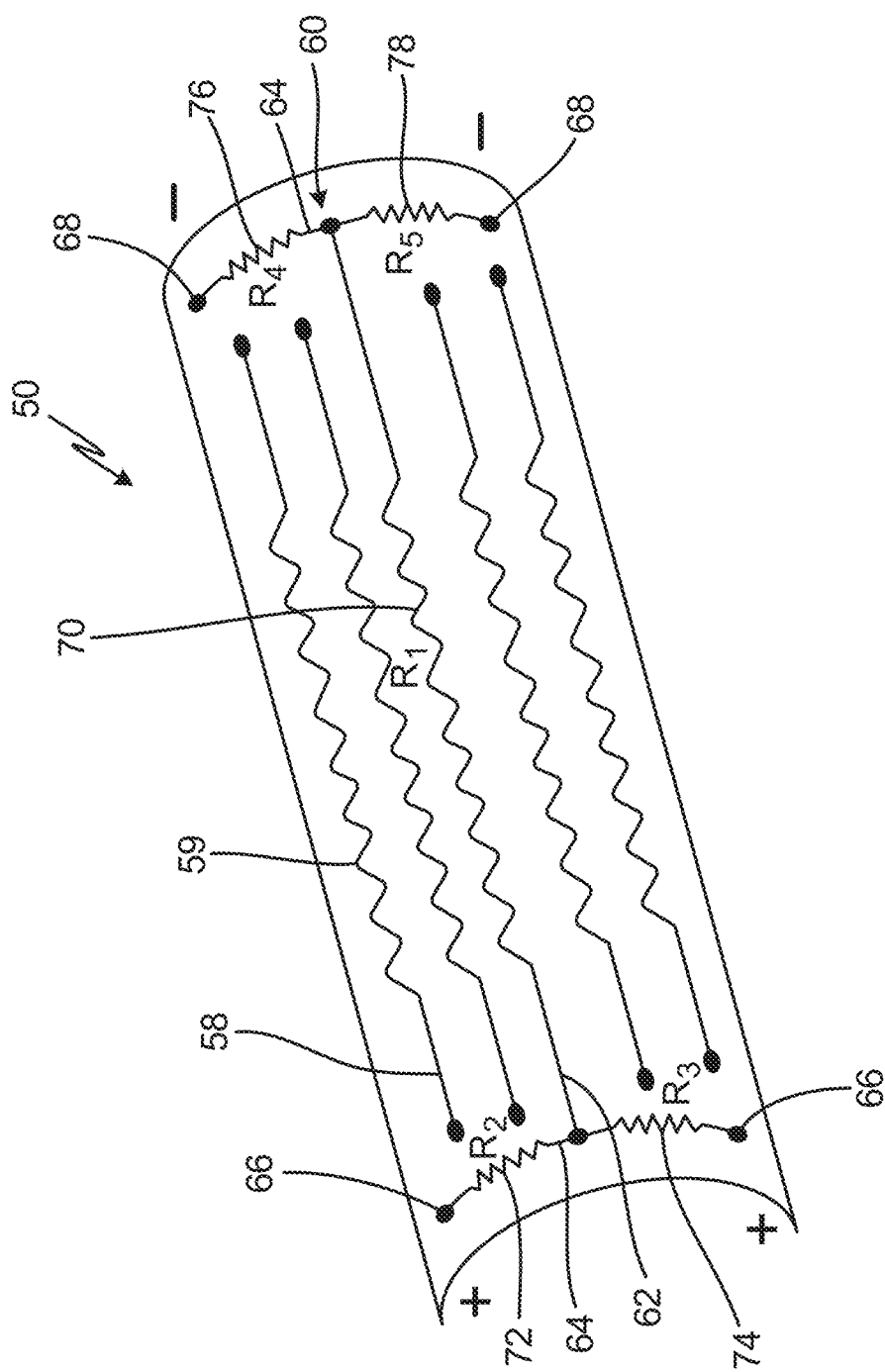

FIG. 3A-3B are schematic drawings of a heated leading edge with an IPS including an H-shaped carbon allotrope heater in a first embodiment. FIG. 3A shows a physical layout of an IPS with H-shaped carbon allotrope heater, while FIG. 3B shows an electrical layout.

FIG. 3A is a schematic drawing of heated leading edge assembly 50 with IPS 51, main section 52, junction sections 56, linear heaters 58, and H-shaped heater 60. H-shaped carbon allotrope heaters 60 for use in IPS system 51 each include spanwise section 62, chordwise sections 64, positive electrical connections 66, and negative electrical connections 68.

Sections 52, 56, and linear heaters 58 are similar to those components discussed in relation to FIG. 2. Main section 52 has both a span and a chord. Linear heaters 58 are applied on main section 52 in a spanwise direction. Linear heaters 58 do not reach junction sections 56.

The use of an "H" pattern design for heater 60 encompasses two chordwise sections 64 and one spanwise section 62. Chordwise sections 64 run along the chord of main section 52, while spanwise section 62 runs along the span of main section 52. Chordwise sections 64 have equal lengths and run parallel to each other. Spanwise section 62 connects chordwise sections 64 at the center of chordwise sections 64, forming an "H" shape.

Chordwise sections 64 lay close to the edges of the joints in junction section 56. This mitigates cold in junction sections 56 of leading edge assembly 50. Chordwise sections 64 are electrically coupled with spanwise section 62 and can be operated in anti-icing mode to prevent ice growth.

In the embodiment of FIGS. 3A-3B, chordwise sections 64 host electrical connections to heater 60. Positive electrical connections 66 reside on opposite ends of the first chordwise section, while negative electrical connections 68 reside on opposite ends of the second chordwise section. Electrical connections to 66, 68, can be made through bus bar, wires, solder paste, or other appropriate connecting material that couples heater 60 to a power source.

FIG. 3B is a schematic drawing of the electrical configuration of H-shaped heater 60 on leading edge assembly 50. Here, linear heaters 58 are shown with resistors 59. H-shaped heater 60 is shown with spanwise resistor 70, and chordwise resistors 72, 74, 76, and 78.

Resistors 59 are each situated spanwise, centrally on one of linear heaters 58. Each of resistors 59 are equal to each other. Resistor 70 resides on spanwise section 62 of heater 60. Resistor 70 is equal to twice of one resistor 59. Resistors 72, 74, 76, 78 reside on chordwise sections 64 of heater 60. Each of resistors 72, 74, 76, 78, is equal to one resistor 59.

This resistor configuration allows for constant power throughout heater 60 and the entire IPS on leading edge assembly 50. In some embodiments, this is accomplished by constant current and constant resistance. Alternatively, this is accomplished by variable current and variable resistance to yield constant power.

Figure 4A:
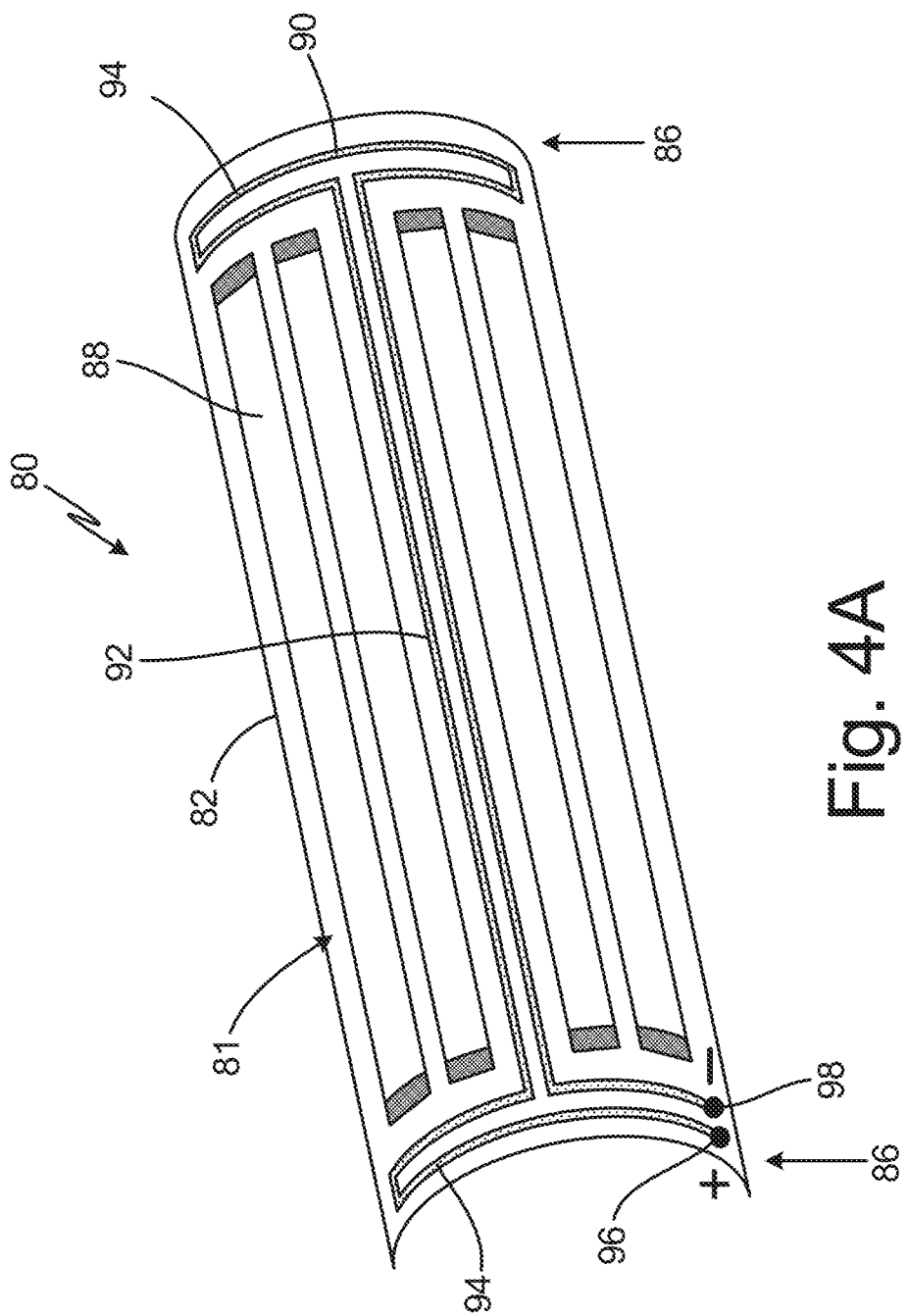
FIGS. 4A-4B are schematic drawings of a heated leading edge with an IPS including an H-shaped carbon allotrope heater in a second embodiment.
Figure 4B:
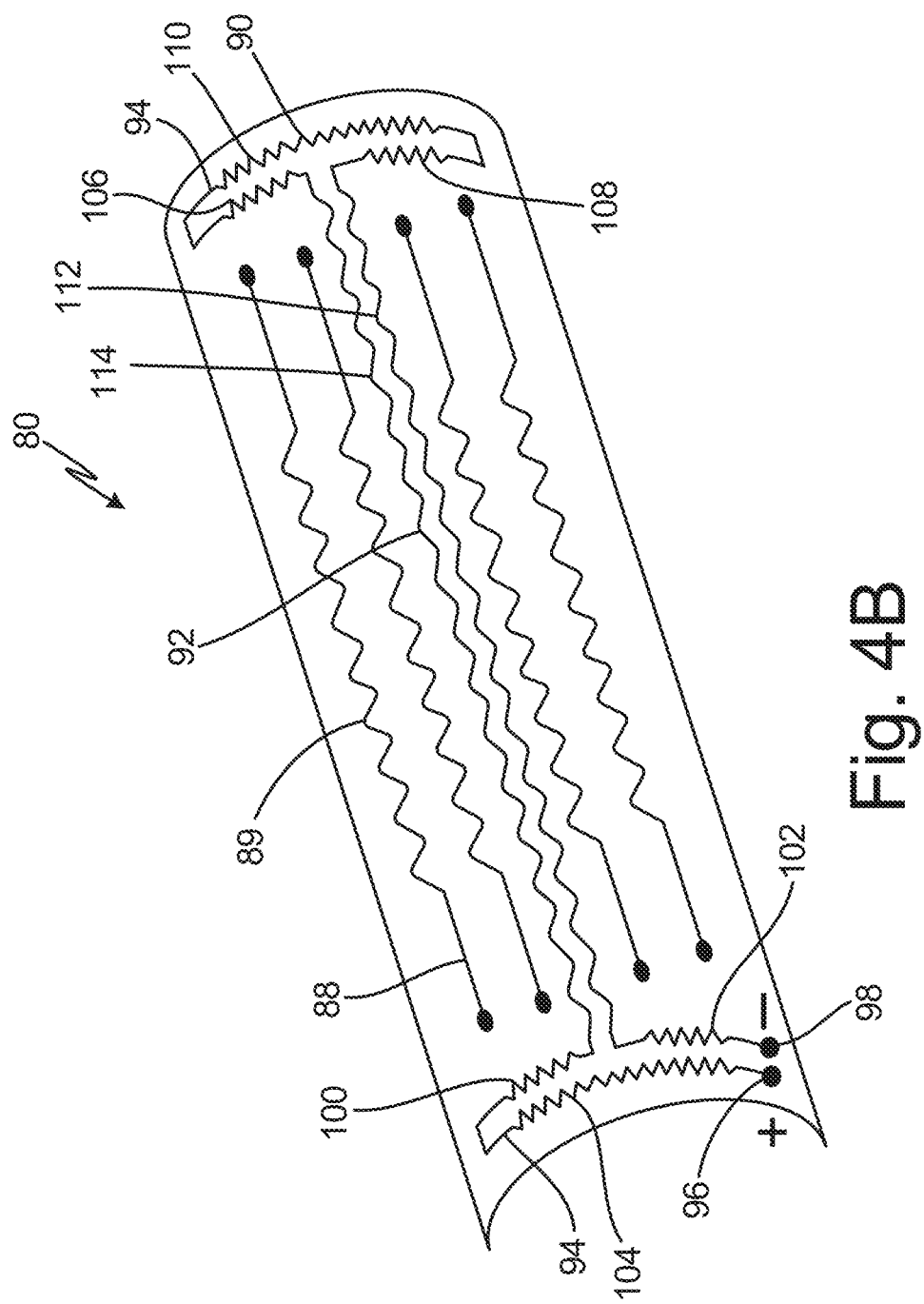

FIGS. 4A-4B are schematic drawings of a heated leading edge with an IPS including an H-shaped carbon allotrope heater in a second embodiment. FIG. 4A shows a physical layout of an IPS with H-shaped carbon allotrope heater, while FIG. 4B shows an electrical layout.

FIG. 4A is a schematic drawing of heated leading edge assembly 80 with IPS 81, main section 82, junction sections 86, linear heaters 88, and H-shaped heater 90. H-shaped carbon allotrope heater 90 for use in an IPS system is in a different electrical configuration than heater 60. Heater 90 includes spanwise section 92, chordwise sections 94, positive electrical connection 96, and negative electrical connection 98.

Sections 82, 86, and linear heaters 88 are similar to those components discussed in relation to FIG. 2. Main section 82 has both a span and a chord. Linear heaters 88 are applied on main section 82 in a spanwise direction. Linear heaters 88 do not reach junction sections 86.

The use of an "H" pattern design for heater 90 encompasses two chordwise sections 94 and one spanwise section 92. This mitigates cold in junction sections 86 of leading edge assembly 80. Here, the "H' pattern of heater 90 is a snakelike pattern running from positive electrical connection 96 to negative electrical connection 98 in the shape of an "H." The benefits of this configuration are that electrical connections are minimized while ensuring the entire "H" heats simultaneously. Electrical connections 96, 98, can be connected in a fashion similar to those described in reference to FIG. 3A.

FIG. 4B is a schematic drawing of the electrical configuration of H-shaped heater 90 on leading edge assembly 80. Assembly 80 includes linear heaters 88 with resistors 89, H-shaped heater 90 with spanwise section 92, chordwise sections 94, connections 96, 98, and resistors 100, 102, 104, 106, 108, 110, 112, and 114.

On linear heaters 88, resistors 89 are each situated spanwise, centrally on one of linear heaters 88. Each of resistors 89 are equal to each other. Resistors 100, 102, 104, 106, 108, and 110 reside on chordwise sections of heater 90. Resistors 100, 102, 106, and 108 are equal in length. Likewise, resistors 104 and 110 are equal in length. Resistors 112 and 114 reside on the spanwise portion of heater 90. This electrical configuration allows for variable electrical power throughout heater 90 and leading edge assembly 80. This can be accomplished through constant current with variable resistance.

Alternatively, H-shaped heaters can be replaced with T-shaped or L-shaped heaters. These heater shapes have at least one chordwise section capable of being applied closely to the edge of a component section so that a resulting junction section is heated by the chordwise section. Each of these shapes of heaters should also have at least one spanwise section connected to the at least one chordwise section. The spanwise section allows for electrical connection between the chordwise section across the component surface.

The heater having at least one chordwise section allows for mitigation of ice build-up in junction or joint sections on aircraft components. Ice build-up can interfere with normal wing operations, such as power slats, in addition to affecting aerodynamics. Ice build-up can also act as an anchor, and promote additional ice growth or "bridging" when allowed to accumulate in junction areas. The use of such a heater streamlines ice protection through the use of a spanwise connecting section between two chordwise sections. Due to this geometry, additional electrical connections or circuitry are not needed to heat junction sections.

Discussion of Possible Embodiments

The following are non-exclusive descriptions of possible embodiments of the present invention.

An ice protection system includes a first section, a second section attached to the first section by a joint, and a junction section, a first plurality of heaters expanding spanwise across the first section, a second plurality of heaters expanding spanwise across the second section, a first H-shaped heater on the first section, expanding into the junction section, and a second H-shaped heater on the second section, expanding into the junction section. The first section has a first span and a first chord. The second section has a second span and a second chord. The junction section includes a portion of the first section and a portion of the second section proximal the portion of the first section The system of the preceding paragraph can optionally include, additionally and/or alternatively, any one or more of the following features, configurations and/or additional components:

The ice protection system is applied to a component selected from the group consisting of wing leading edges, vertical stabilizer leading edges, horizontal stabilizer leading edges, pylons, vanes, propellers, blades, engine inlets and surfaces requiring adjacent heaters.

The first and second H-shaped heaters each comprise two chordwise sections connected by a spanwise section.

The first and second H-shaped heaters further comprises a resistor on the spanwise section and two resistors on each of the chordwise sections.

The first and second H-shaped heaters comprises an electrical resistivity between between 0.005 ohms per square ($\Omega$/sq) and 3.0 $\Omega$/sq.

The first and second H-shaped heaters each comprise a material selected from the group consisting of carbon nanotubes, graphene, graphene nanoribbons, and combinations thereof Electrical power is constant throughout each of the first and second H-shaped heaters.

The first and second H-shaped heaters further include two positive electrical connections each at the end of a first chordwise section, and two negative electrical connections each at the end of a second chordwise section.

Electrical power is variable throughout each of the first and second H-shaped heaters.

Each of the first and second H-shaped heaters includes a positive electrical connection at one end of a chordwise section and a negative electrical connection at the one end of the chordwise section.

An ice protection system includes a component having a plurality of sections and a plurality of heaters each having at least one chordwise section connected to a spanwise section. Each of the plurality of sections is connected to the adjacent section by a junction section. One of the plurality of heaters resides on each of the plurality of sections, and each of the chordwise sections resides in a junction section.

The system of the preceding paragraph can optionally include, additionally and/or alternatively, any one or more of the following features, configurations and/or additional components:

The system includes a plurality of linear spanwise heaters on each of the plurality of sections, and wherein each of the plurality of linear spanwise heaters do not reach the junction section.

Each of the plurality of heaters is H-shaped, T-shaped, or L-shaped.

Each of the plurality of H-shaped heaters further comprises at least one positive electrical connection and at least one negative electrical connection.

An H-shaped heater includes a first chordwise section, a second chordwise section parallel to the first chordwise section, wherein the first chordwise section and the second chordwise section are aligned, and a spanwise section extending from a central region of the first chordwise section to a central region of the second chordwise section.

The heater of the preceding paragraph can optionally include, additionally and/or alternatively, any one or more of the following features, configurations and/or additional components:

The heater comprises a material selected from the group consisting of carbon nanotubes, graphene, graphene nanoribbons, and combinations thereof The heater includes a first positive electrical connection on a first end of the first chordwise section, a second positive electrical connection on a second end of the first chordwise section, wherein the second end is opposite the first, a first negative electrical connection on a first end of the second chordwise section, and a second negative electrical connection on a second end of the second chordwise section, wherein the second end is opposite the first.

The heater includes a first resistor centered on the spanwise section, a second resistor on the first chordwise section centered between the first end of the first chordwise section and the spanwise section, a third resistor on the first chordwise section centered between the second end of the first chordwise section and the spanwise section, a fourth resistor on the second chordwise section centered between the first end of the second chordwise section and the spanwise section, and a fifth resistor on the second chordwise section centered between the second end of the second chordwise section and the spanwise section The heater includes a positive electrical connection on a first end of the first chordwise section and a negative electrical connection on the first end of the first chordwise section.

The spanwise section has a first width, and each of the chordwise sections have a second width being half the size of the first width.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An ice protection system for an aircraft component comprising:
    a first section of the aircraft component having a first span and a first chord;
    a second section of the aircraft component, adjacent to the first section of the aircraft component, having a second span and a second chord, wherein the first section of the aircraft component and the second section of the aircraft component meet at a joint;
    a junction section comprising:
        an end portion of the first section of the aircraft component;
        an end portion of the second section of the aircraft component adjacent to the end portion of the first section of the aircraft component, and
        the joint;
    a first plurality of heaters expanding spanwise across the first section of the aircraft component configured to heat the first section of the aircraft component;
    a second plurality of heaters expanding spanwise across the second section of the aircraft component configured to heat the second section of the aircraft component;
    a first H-shaped heater on the first section of the aircraft component expanding into the junction section, wherein the first H-shaped heater has at least one chordwise section connected to at least one spanwise section and the at least one chordwise section is positioned in the junction section close to the joint such that the at least one chordwise section is configured to heat the end portion of the first section of the aircraft component; and
    a second H-shaped heater on the second section of the aircraft component, expanding into the junction section, wherein the second H-shaped heater has at least one chordwise section connected to at least one spanwise section and the at least one chordwise section is positioned in the junction section close to the joint such that the at least one chordwise section is configured to heat the end portion of the second section of the aircraft component.

2. The system of claim 1, wherein the ice protection system is applied to a component selected from the group consisting of wing leading edges, vertical stabilizer leading edges, horizontal stabilizer leading edges, pylons, vanes, propellers, blades, engine inlets and surfaces requiring adjacent heaters.

3. The system of claim 1, wherein the first and second H-shaped heaters each comprise two chordwise sections connected by a spanwise section.

4. The system of claim 3, wherein each of the first and second H-shaped heaters further comprises a resistor on the spanwise section and two resistors on each of the chordwise sections.

5. The system of claim 1, wherein each of the first and second H-shaped heaters comprises an electrical resistivity between 0.005 ohms per square ($\Omega$/sq) and 3.0 $\Omega$/sq.

6. The system of claim 1, wherein the first and second H-shaped heaters each comprise a material selected from the group consisting of carbon nanotubes, graphene, graphene nanoribbons, and combinations thereof.

7. The system of claim 1, wherein electrical power is constant throughout each of the first and second H-shaped heaters.

8. The system of claim 7, wherein each of the first and second H-shaped heaters further comprises:
    two positive electrical connections each at the end of a first chordwise section; and
    two negative electrical connections each at the end of a second chordwise section.

9. The system of claim 1, wherein electrical power is variable throughout each of the first and second H-shaped heaters.

10. The system of claim 9, wherein each of the first and second H-shaped heaters further comprises:
    a positive electrical connection at one end of a chordwise section; and
    a negative electrical connection at the one end of the chordwise section.

* * * * *